No. 680,447. J. SWEDIN. Patented Aug. 13, 1901.

COCK.

(Application filed Oct. 8, 1900.)

(No Model.)

Witnesses:
R. J. Jacker
Jno. W. Strehli

Inventor:
John Swedin

UNITED STATES PATENT OFFICE.

JOHN SWEDIN, OF CHICAGO, ILLINOIS, ASSIGNOR OF ONE-HALF TO MARTIN ZATTERBERG, OF SAME PLACE.

COCK.

SPECIFICATION forming part of Letters Patent No. 680,447, dated August 13, 1901.

Application filed October 8, 1900. Serial No. 32,323. (No model.)

*To all whom it may concern:*

Be it known that I, JOHN SWEDIN, a citizen of the United States, residing at the city of Chicago, in the county of Cook and State of Illinois, have invented certain new and useful Improvements in Cocks, of which the following is a specification.

The object of my invention is to produce a cheap, simple, and efficient cock or faucet to be used in connection with stationary washstands or the like. It belongs to that class of stop-cocks which closes automatically after sufficient water has been allowed to flow through it by the operator releasing his hold on the spigot.

Another feature of my invention is to so shape the parts which are subject to wear and tear that they will be more durable and lasting and adapt themselves to ordinary wear.

Figure 1:
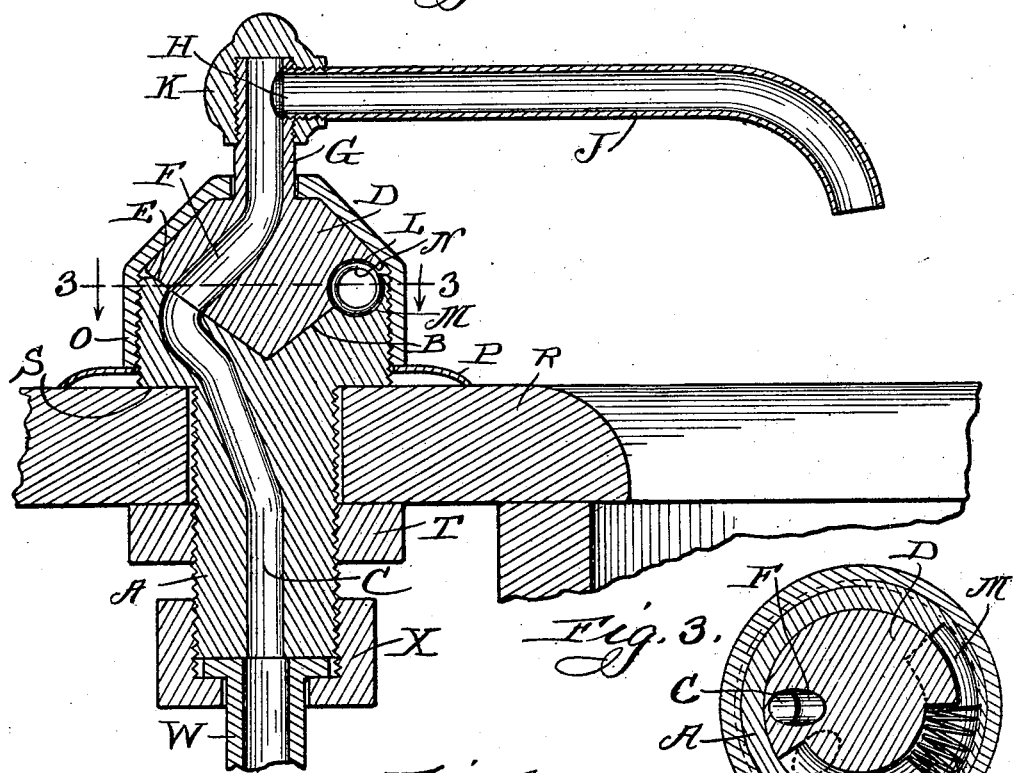
Figure 3:
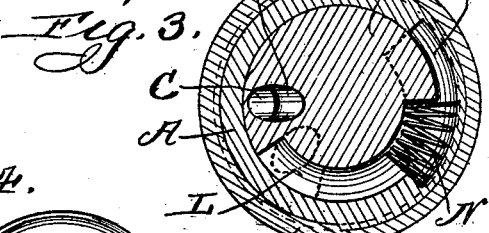
Figures 2, 4:
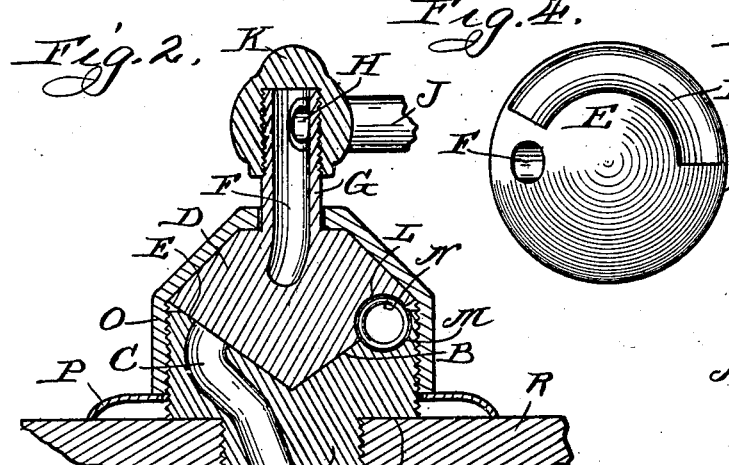
Figure 5:
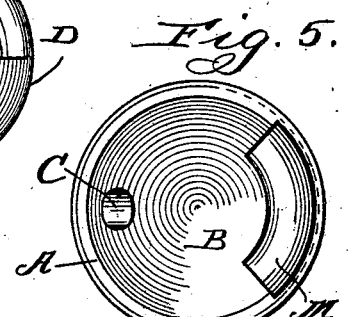

In the accompanying drawings, forming part of this specification, Figure 1 is a central longitudinal section of my invention, the cock being in use and the flow of water uninterrupted. Fig. 2 is a similar view as shown in Fig. 1, the lower parts being broken away, the cock being out of use, and the flow of water being interrupted. Fig. 3 is a cross-section taken on lines 3 3 of Fig. 1. Fig. 4 is a bottom view of the cone-shaped plug or gate which acts as a valve to allow or interrupt the flow of water, and Fig. 5 is a top view of the seat for the plug or valve shown in Fig. 4.

A represents an elongated stem-screw threaded at its periphery and having at its top a deep concave face or seat B, V-shaped in cross-section. This stem has passing through it the peculiarly-shaped inlet-orifice C. This orifice is straight at its lower end, then turns at an angle, and then toward its top is bulb-shaped, so that the passage of water will be even and regular.

D represents a cone-shaped plug or cut-off valve or gate. The face E of this plug is V-shaped in cross-section and fits snugly and turns on the face or seat B of stem A. This plug D has passing through it at an angle, as shown, an orifice F. This orifice F also passes through the neck G, which forms part of the plug D, and extends up from it, being screw-threaded at its upper end. This orifice F has its exit at H, where it connects with the spigot J. The spigot J is shaped as in Fig. 1 and is screw-threaded at its rear end, where it is screwed into the screw-threaded part of the cap K, which cap is first screwed onto the screw-threaded neck of the plug D.

In the face E of the cone-shaped plug D, I cut an elongated recess L, and into the face B of the stem A, I cut a short recess M. Lying half in recess L and half in recess M is the coiled spring N. A cap O fits over the body of the plug D and top of stem A, being interiorly screw-threaded below to screw onto the peripheral screw-thread on the top of stem A, its lower edge impinging against an annulus P, which is used to make a close joint and for ornament. This annulus P rests on the top of the washstand or basin R.

The cock is put in place as follows: The head of the stem A rests on the top of the washstand or basin R, as shown at S. A nut T is then screwed up tight on the peripheral screw-thread on the stem A until the parts are held firmly and rigidly in position. The connection with the usual water-pipe W is made by the connection or union nut X.

The device operates as follows: When the cock is closed, the parts assume the position shown in Fig. 2, this of course being the normal position. When it is desired to operate the device and start the flow of water into the basin R, the operator takes hold of the spigot J and moves it from the position shown in Fig. 2 toward him, as shown in Fig. 1, bringing the mouth of the spigot J over the basin R, (the spigot J being permanently connected to cap K and cap K permanently to neck G, which is integral with plug or valve-gate D.) This movement of the spigot J moves the face E on the plug D over the face B of the stem A until the mouth of orifice F comes opposite the mouth of orifice C, thus establishing a continuous passage-way for the water from the supply-pipe W, and the flow commences and continues until the desired amount of water is obtained. By this movement the edge of recess L has abutted against the spring M and compressed it or put it under a tension. (See Fig. 3.) Now that the desired amount of water has been obtained the operator releases his hold of the spigot and the parts move back in an opposite direction into their normal position assisted by the spring M, the tension on which being released it flies back into its accustomed and extended position, thus forcing the parts back and cutting off the flow of water, this cutting-off operation being automatic.

Of course the parts may be differently shaped and the faces on the stem and plug may be straight or otherwise, being shaped as shown, however, to prevent wear.

If desired, the spring and recesses may be omitted and the spigot used to shut off the supply of water by turning it back with the hand. If desired, other means may be used to cut off the water-supply.

What I claim as new and of my invention, and desire to secure by Letters Patent, is—

1. In a stop-cock, a stem A, having a seat B, in combination with a plug D, having a face E, the lower part of plug D, which forms its face being conical and fitting the peculiar-shaped seat B, of stem A, orifices passing through said stem and plug which are brought to meet to make a continuous passage for the water by moving the spigot over the bowl, the supply of water being cut off, by moving the spigot back into its normal position, substantially as and for the purposes set forth.

2. In a stop-cock a stem A, having a seat B, in combination with a plug D, having a face E, the lower part of plug D, which forms its face, being conical and fitting the peculiar-shaped seat B, of stem A, orifices passing through said stem and plug, which are brought to meet to make a continuous passage for the water by moving the spigot over the bowl, the moving of the parts to assume this position putting a tension on a spring which lies between said stem and plug, and when the spigot is released the parts are forced to assume their normal positions and the supply of water is cut off automatically, by the spring flying back to its normal or released position; all combined as set forth.

JOHN SWEDIN.

Witnesses:
JNO. W. STREHLI,
R. J. JACKER.